No. 624,183. Patented May 2, 1899.
J. R. COOK.
TOBACCO TAGGING MACHINE.
(Application filed Feb. 4, 1898.)

(No Model.) 4 Sheets—Sheet 1.

Witnesses
Zula Green
R. D. Hawkins

Inventor
John R. Cook
By T. H. Lockwood
His Attorney.

No. 624,183. Patented May 2, 1899.
J. R. COOK.
TOBACCO TAGGING MACHINE.
(Application filed Feb. 4, 1898.)
(No Model.) 4 Sheets—Sheet 2.
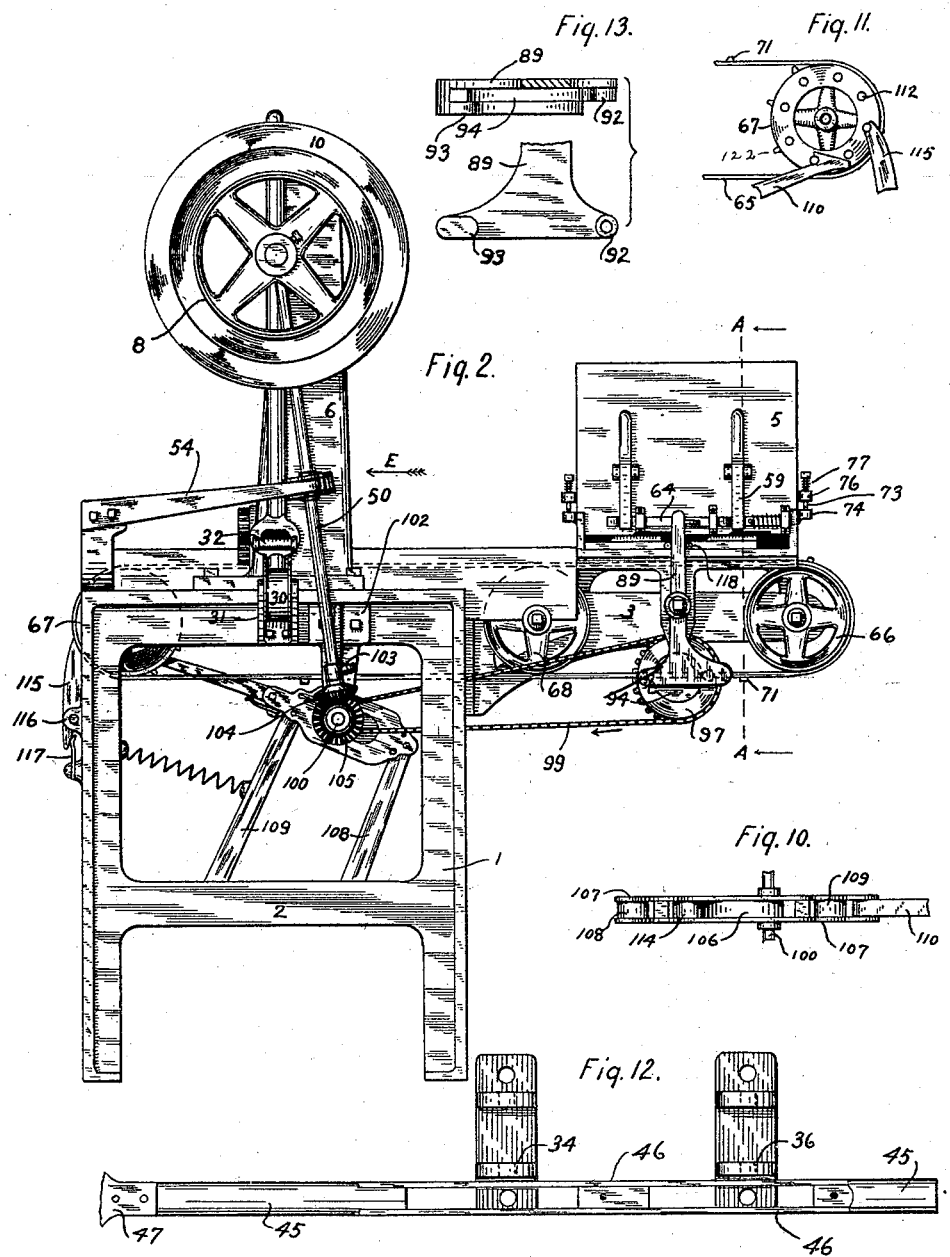

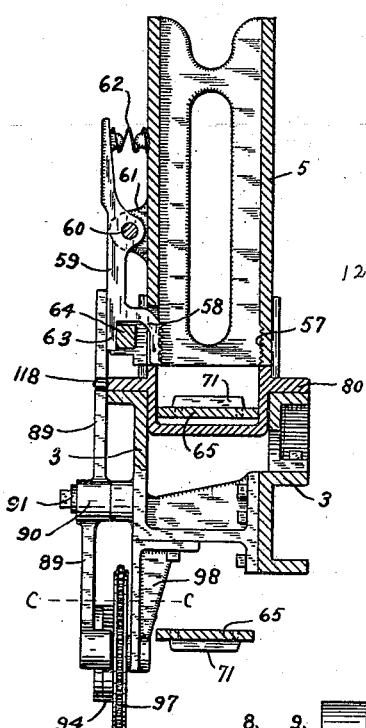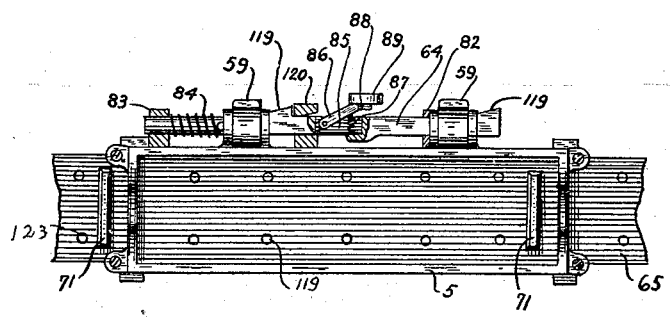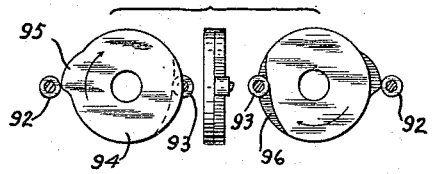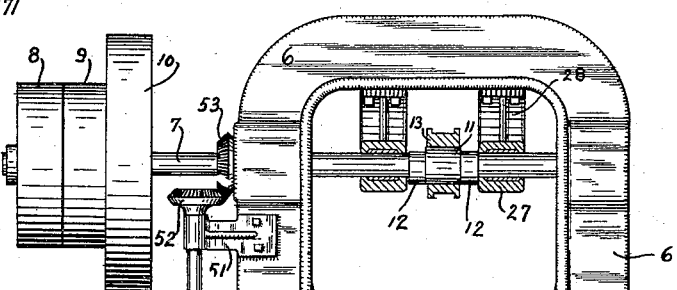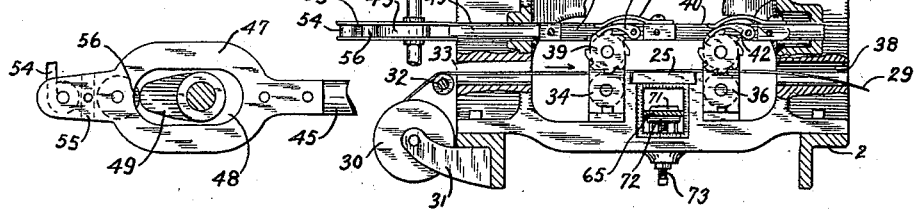

No. 624,183. Patented May 2, 1899.
J. R. COOK.
TOBACCO TAGGING MACHINE.
(Application filed Feb. 4, 1898.)
(No Model.) 4 Sheets—Sheet 4.

Witnesses
Zula Green
R. D. Hawkins.

Inventor
John R. Cook
By V. H. Lockwood
His Attorney.

UNITED STATES PATENT OFFICE.

JOHN R. COOK, OF INDIANAPOLIS, INDIANA, ASSIGNOR TO LAWRENCE T. RILEY, OF SAME PLACE.

TOBACCO-TAGGING MACHINE.

SPECIFICATION forming part of Letters Patent No. 624,183, dated May 2, 1899.

Application filed February 4, 1898. Serial No. 669,163. (No model.)

*To all whom it may concern:*

Be it known that I, JOHN R. COOK, of Indianapolis, county of Marion, and State of Indiana, have invented a certain new and useful Tobacco-Tagging Machine; and I do hereby declare that the following is a full, clear, and exact description thereof, reference being had to the accompanying drawings, in which like numerals refer to like parts.

This invention relates especially to improvements in a machine of the class described in the patent to Eugene H. Peck, No. 327,306, dated September 25, 1885, for feeding the plugs of tobacco to the tag-affixing punches and for feeding the strip of tin or other metal from which the tags are punched. These, with the other features of invention in this machine, will be understood from the following description and claims and the accompanying drawings.

Figure 1:
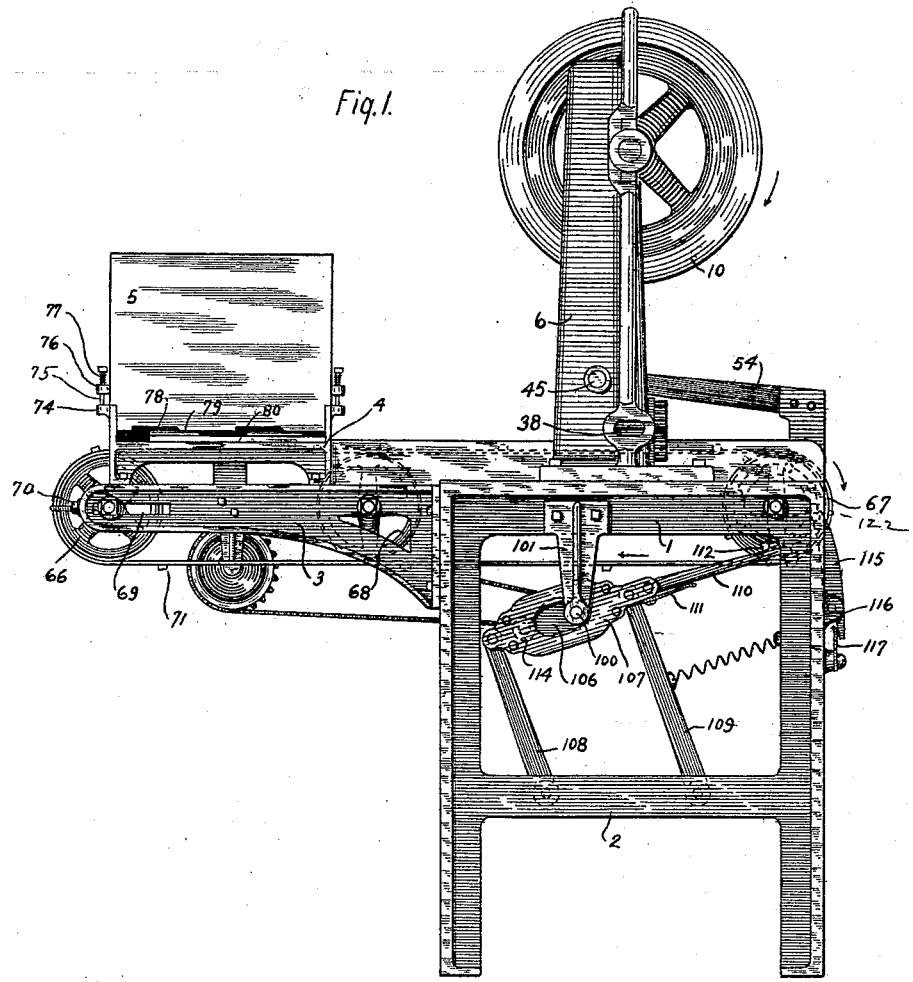
Figure 8:
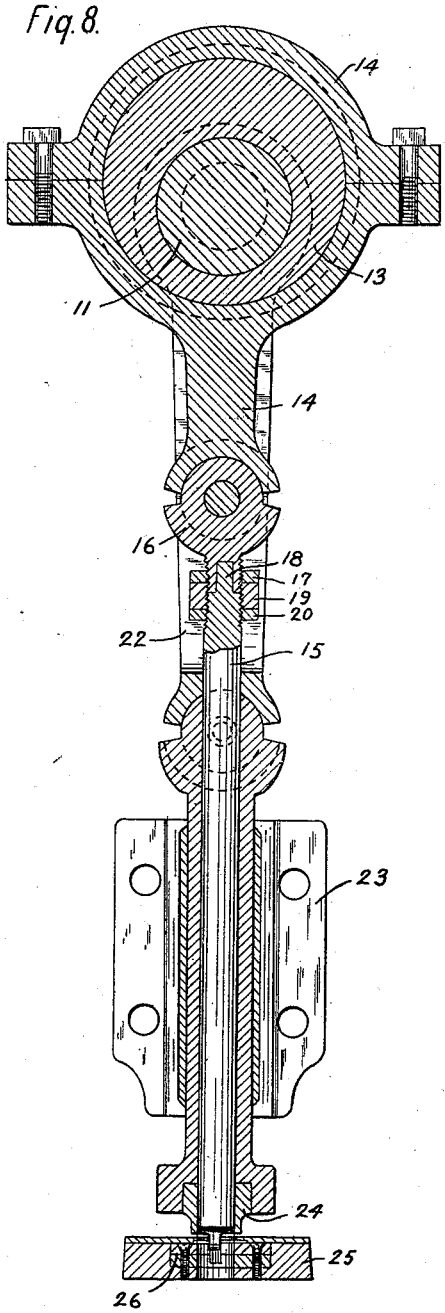
Figure 9:
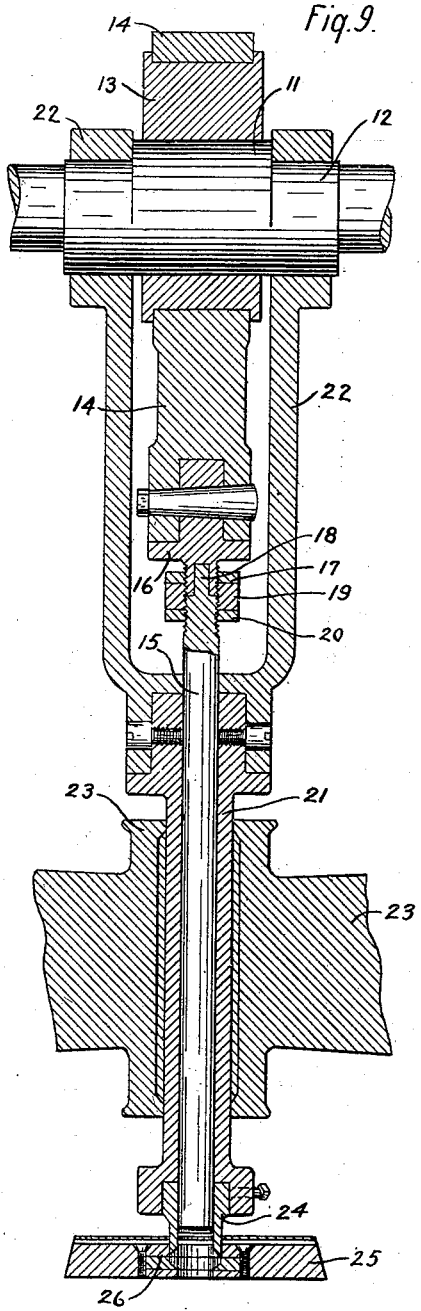

In the drawings, Figure 1 is a front elevation of the machine. Fig. 2 is a rear elevation of the same. Fig. 3 is a cross-section on the line A A of Fig. 2. Fig. 4 is a plan view of the tobacco-box and attachment, looking down upon the box as shown in Fig. 1. Fig. 5 shows in detail the cam that actuates the tobacco-feeding device, it being a double cam, the rear elevation of such cam being shown at the left hand, the front elevation at the right hand, and a rear view in the central portion, of said figure. Fig. 6 is a right-hand elevation of the upper part as shown in Fig. 2, with parts in section to disclose the feed device for the metal strip. Fig. 7 is a detail of the cam for actuating the mechanism for feeding the metallic strip. Fig. 8 is a central vertical longitudinal section of the punches and dies, with the connecting parts of the machine broken away. Fig. 9 is a central cross-section of the same. Fig. 10 is a plan view of the cam-plate used in driving the pulleys that carry the conveyer-belt. Fig. 11 is a detail view of the driving-pulley that carries the conveyer-belt. Fig. 12 is a plan view of the bar that actuates the rollers for feeding the metal strip through the machine and also said rollers and mountings. Fig. 13 is a section on the line C C of Fig. 3.

In detail, 1 is a table constructed in any suitable way, that shown having four legs, the pair of legs at each end being connected by a cross piece or bar 2. I secure to the left side of the table, near the top, a bracket 3 by means of bolts. Upon said bracket I bolt a frame 4, and upon this frame I mount the tobacco-box 5. The box 5 is shown in front and rear elevations in Figs. 1 and 2 and in cross-section in Fig. 3. In it the tobacco is placed preparatory to its being fed to the punch and die.

On the center of the table I bolt the inverted-U-shaped frame 6, in which are carried the punches and dies and a portion of the mechanism by which the strip of metal from which the tags are cut is fed.

The driving-shaft 7 is mounted horizontally in the frame 6 and has on its outer end the driving-pulley 8, idler 9, and drive-wheel 10. Said shaft between the two arms or sections of the frame 6 is provided with an enlargement 11, centrally located and having the eccentrics 12 on each side thereof. On said enlargement 11 I secure a cam-collar 13. The extension of the cam-collar 13 is opposite to that of the extension of the eccentrics 12. On the cam-collar 13 I mount a connecting-rod 14, that is secured to the central punch 15. This punch consists of a main portion and a shank 16, that has an extension 17, externally threaded and centrally provided with a socket. The upper end of the body of the punch 15 is likewise externally threaded and provided with a pin 18, that enters the socket 17. Lock-nuts 19 and 20 hold these parts together. The purpose of this construction is to adjust the length of the punch 15. The shank 16 of the punch is connected with the connecting-rod 14 by means of a knuckle-joint. I provide also an outer hollow punch 21, surrounding the inner punch 15 and connected with the eccentrics 12 by two connecting-arms 22. The connecting-arms 22 are connected with the outer punch 21 also by a knuckle-joint. The purpose of the knuckle-joint is to permit the punches to have accurate vertical movement and also to strengthen the connection and make it better than a mere pivoted connection. The punches reciprocate between the inclosing faces of the arms 23, that extend inward from the sides of the frame 6. At the lower end of the outer punch 21 a pair of punch-points 24 are secured.

25 is a die-plate, and 26 are the dies; but this portion of the mechanism shown constitutes no part of my invention so far as this application is concerned, as it is to be found substantially in Letters Patent to Eugene H. Peck, No. 327,306, dated September 29, 1885.

The shaft 7 is provided with bearings 27, connected with the frame 6 by the arms 28 to centrally support said shaft.

The tags are cut from a strip 29 of sheet metal or tin, which is wound originally on the spool 30, rotatably mounted in brackets 31, secured to the framework. From said spool one metal strip passes over the roller 32, through the passage-way 33 in one side of the frame 6, between a pair of feed-rolls 39 and 34, over the die-plate 25, through another set of feed-rolls 40 and 36, and out through the passage-way 38 in the other side of the frame 6. The rolls 39 and 40, whereby the metal strip is fed, are driven by ratchets secured thereon and the pawls 41 and 42, that are pressed into engagement by the springs 43 and 44. The pawls 41 and 42 are pivotally mounted to a sliding bar 45, that is formed of a pair of plates 46, with suitable spacing-blocks between. Said bar has on it a built-up plate or shank 47, as seen in Fig. 7, centrally provided with a slot 48, in which operates a cam 49, secured to the vertical shaft 50, that has a bearing in the bracket 51, secured to the frame 6, and at its upper end a bevel-gear 52, that meshes with and is driven by the bevel-gear 53 on the driving-shaft 7. The cam 49 causes a movement of the bar 45, so that every time said bar is moved toward the left the feed-rollers above described move the metal strip the desired distance. A spring 54 (to be seen in Fig. 2) constantly presses against the bar 45 at 55, tending to push said bar 45 to the right, and thereby keeping the friction-wheel 56 in constant engagement with the cam 49.

The plugs of tobacco are fed to the machine by the following mechanism: As has been stated, the tobacco-box 5 is filled with plugs of tobacco. These plugs are prevented from escaping when not desired by a series of teeth 57, provided on one side of the box, near its lower end, and a toothed jaw 58, corresponding therewith and mounted on the trip 59, that is pivoted at 60 in the brackets or ears 61. The jaw is held in an inward position by the spiral spring 62, which tends to push the upper end of the trip-lever outward. The trip-lever is provided with the projections 63, that are engaged by the cross-bar 64 to move the jaw 58 to the left, as seen in Fig. 3, thereby permitting the plugs to drop onto the conveyer-belt 65. This belt is seen in cross-section in Fig. 3 and in full and dotted lines in Figs. 1 and 2 passing about the pulley 66 at one end and the pulley 67 at the other end and over a supporting-pulley 68, midway between the former. The pulley 66 is adjustably mounted in slots 69 and held therein by a set-screw 70. Said belt is provided with cross bars or ribs 71 for the purpose of compelling the plug to move with the conveyer-belt. Said belt passes over the table of the machine in going one way and under it in going the other way. It passes immediately beneath the box 5, as seen in Figs. 1, 2, and 3, and beneath the die 25, as seen in Fig. 6. When a plug of tobacco on such belt is beneath the die 25, the punches punch out the tag from the metal strip, punch it through the die, and force it against the tobacco, so that the prongs of such tag will penetrate the tobacco. To accommodate plugs of different thicknesses, the belt 65 can be adjusted closer to or farther from the die 25 by means of the adjustable support 72, rendered adjustable by the adjusting set-screw 73. (To be seen in Fig. 6.)

The plugs of tobacco are removed as wanted from the box as follows: Said box, as seen in Fig. 1, is mounted on ears 74 on the frame-piece 4 by means of rods or pins 75, that pass through the ears 76 on the box. A spring 77 is spirally wound about the rods or pins 75 between the ears 76 and the head of the rods or pins 75, so as to tend to push the box downward. Said box on the side thereof, at its lower edge, is provided with two recesses 78, with bevel or inclined surfaces at the right hand, as seen, making, therefore, a bevel projection at the right hand of each recess. Such bevel projection is engaged by corresponding bevel projections 79 on the sliding plate 80. From this it is seen that when said sliding plate 80 is moved to the right the engaging bevel projections will cause the box to be elevated, as seen in Figs. 1 and 2, while if said sliding plate is moved to the left until the projections 79 register with the recesses 78 the box will drop down into close engagement with said sliding plate. Said sliding plate 80 is formed in cross-section, as shown in Fig. 3. The body of it is U-shaped, with oppositely-extending supporting-flanges that rest upon the frame 4 on one side and the frame 3 on the other. By this it is seen that the space between the lower part of the box and the belt 65 (see Fig. 3) may be increased or diminished to permit the downletting of one layer or plug of tobacco when the same is released by the jaws 58.

The jaws 58 are moved to the left, as seen in Fig. 3, to release the tobacco by the following means: As seen in Fig. 4, the sliding bar 64 is mounted in suitable guides 82 and 83 on the side of the tobacco-box 5. The sliding bar is forced normally to the right by the spiral spring 84. Centrally located in said sliding bar 64 there is a recess 85, in which the latch 86 is pivoted, with its free end pushed outward by the spring 87, to be engaged by the lug 88 on the upper end of the lever 89. The lever 89 is pivoted centrally at 90 to the spindle 91, as seen in Figs. 2 and 3. Said lever is enlarged or widened at its lower end, as seen in Fig. 2, and at the right and left hand ends of such widened portion I mount the rollers 92 and 93. (To be seen in Fig. 5.) Said lever 89 is actuated by a double cam 94. (To be seen in Figs. 3 and 5.) One side of said cam is provided with a projection 95 for engaging the roller 92 and thereby actuating said lever 89. The other side of said cam is provided with a recess 96 to permit the above-stated movement of the lever 89—that is, as the roller 92 is moved, say, to the right, at the same time the cam permits the simultaneous movement of the roller 93. The purpose of this arrangement is to enable the double cam to operate said lever in both directions and to operate the lever only once during one revolution of the cam. The cam is driven by the sprocket-wheel 97, to the side of which the cam is secured. Said sprocket-wheel is mounted on the spindle carried by the bracket 98, suspended from the frame 3. The sprocket-wheel is driven by the chain 99, that engages a sprocket-wheel on the shaft 100, mounted in the brackets 101 and 102, secured to the table. The bracket 102 has a horizontal or laterally-extending arm 103, as seen in Fig. 2, that carries the lower end of the shaft 50. Said shaft 50 has at its lower end a bevel-gear 104, that meshes with and drives the bevel-gear 105, secured to the shaft 100. On said shaft I secure a cam-disk 106, that operates in a slotted opening in the built-up plate 107. (To be seen in Figs. 1 and 2.) This slotted plate is carried on the upper ends of links 108 and 109, that are pivotally mounted at their lower ends to the cross-bar 2 of the frame and at their upper ends to said built-up plate 107.

The upper end of the lever 89 extends between two rollers or pins 118 on the sliding plate 80, and thereby said sliding plate is reciprocated. When the upper end of said lever is moved to the right, as seen in Fig. 2, or to the left, as seen in Fig. 4, it is clear that by its engagement with the latch 86 it will move the bar 64. Said bar 64 is provided with two inclined shoulders 119, which when moved to the left, as seen in Fig. 4, engage the projection 63 at the lower end of the lever 59 on which the jaw 58 is mounted, and thereby move the lower end of said lever, and hence said jaw, to the left, as seen in Fig. 3, out of engagement with the plugs of tobacco in the tobacco-box 5. When this occurs, the plugs of tobacco in said box drop down upon the plate 65, as seen in Fig. 3. At about the same time the sliding plate 80 has been moved sufficiently toward the left, as seen in Fig. 6, or to the right, as seen in Fig. 2, to permit the tobacco-box to drop down a slight distance. In the progress of the machine the lever 89 continues to move the bar 64 farther to the left, as seen in Fig. 4, until the latch 86 is forced into the slot 85 by the guideway 120, and such latch ceases to be engaged by the lug 88 on the lever 89. Thus the spring 84 pushes the bar 64 to the right hand, as seen in Fig. 4, into its normal position, and the trip 59 is released, so that the jaw 58 will be moved by the springs 62 to the right, as seen in Fig. 3, into engagement with the plugs of tobacco immediately above the one resting upon the conveyer-belt 65. Then lever 89 is operated in an opposite direction by the means heretofore described, causing the sliding plate 80 to be moved to the right, as seen in Fig. 1, and to the left, as seen in Fig. 2. This movement causes a slight elevation of the tobacco-box. This slight elevation by reason of the jaws 58 gripping and holding the plugs above the one on the conveyer-belt separates the lower plug from the others, so that it can be conveyed by the conveyer-belt without friction or interference of any kind.

The built-up plate 107 is secured to or carries a pawl-piece 110, whose outer end is pushed upward by the spring 111 into engagement with the pins 112 on the pulley 67, that carries the conveyer-belt 65. The pawl 110 is provided at its outer end with a hook upwardly extending, so that when it is moved to the left, as seen in Fig. 1, the pulley 67 will be turned in the direction of the arrow and will move the conveyer-belt in the direction of the arrow. The pawl and built-up belt 107 are kept in a forward position by the spring 113, so that the friction-roller 114 will be in constant engagement with the cam-plate 106. By this construction it is clear that the belt 65 for conveying the plugs of tobacco is given such intermittent movement as is adapted to convey the plugs to the punch and dies as fast as the latter work upon them. The said conveyer-belt is prevented from moving too far by the catch or pawl 115, pivoted at 116 and pressed into engagement by the spring 117, its upper point engaging with the pins on the pulley 67. When the pawl-piece 110 is moved forward preparatory to a movement of the conveyer-belt 65, the outer end of such piece engages the catch 115 and pushes it to the right out of engagement with the pins on the pulley 67, whereby the said pawl-piece is enabled by means of its hook in its reverse movement to engage a pin on said pulley and actuate said pulley a certain distance.

It is very important that the conveyer-belt 65 be positively or regularly moved or driven in order that the plugs of tobacco may be invariably moved at the right time and to the proper extent in order to bring them to the proper place under the die or punch. To accomplish that purpose, I provide a series of pins 122 on the periphery of the drive-pulley 67, that engage a series of apertures or holes 123 in the belt 65. In such case the belt can have no play whatever and must move positively.

What I claim as my invention, and desire to secure by Letters Patent, is—

1. A machine for making and affixing tags to plugs of tobacco including an open-bottom tobacco-box, means for holding the tobacco in the lower end of the box when desired, means for releasing the plugs in the box, a conveyer located immediately beneath the box to receive the lower plug or plugs when released, and means for elevating the box and its contents out of engagement with the plug or plugs deposited on the conveyer, substantially as and for the purpose set forth.

2. A machine for making and affixing tags to plugs of tobacco including an open-bottom tobacco-box, means located near the bottom thereof for holding the plugs in the box when desired, means for releasing the plugs in the box, a conveyer immediately beneath said box to receive the lower plugs when released, a plate slidable immediately beneath the sides of said box provided with beveled elevations or projections that engage the sides of said box when operated, and means for sliding said plate when the lower plugs are deposited on the conveyer for elevating the box and its contents out of engagement with the plugs on the conveyer.

3. A machine for making and affixing tags to plugs of tobacco including a suitable frame provided with upwardly-extending rods or pins, an open-bottom tobacco-box mounted on said frame provided with apertured ears through which said rods loosely extend, springs mounted on said rods to press said tobacco-box downward, a conveyer immediately beneath the tobacco-box, a holding device for holding the lower plugs in the tobacco-box when desired, a sliding plate mounted beneath the sides of the tobacco-box, inclined projections thereon that engage the sides of such box when operated, and means for sliding said plate.

4. A machine for making and affixing tags to plugs of tobacco including an open-bottom tobacco-box, means for holding the tobacco in the lower end of the box when desired, a conveyer located immediately beneath the box to receive the lower plug or plugs when released, a sliding plate mounted beneath the sides of the tobacco-box with inclined projections that engage the sides of such box when operated, and means for simultaneously sliding said plate and releasing said holding device.

5. A machine for making and affixing tags to plugs of tobacco including a tobacco-box with an open bottom, one or more spring-held trips pivoted to the side of said box with jaws entering said box near the bottom thereof to hold in the plugs of tobacco, a sliding latch-bar mounted alongside said box with inclinations that, when said bar is operated, will engage said trips and remove their jaws from engagement with the plugs of tobacco, and means for actuating the said latch-bar, substantially as set forth.

6. A machine for making and affixing tags to plugs of tobacco including a tobacco-box with an open bottom, one or more spring-held trips pivoted to the side of said box with jaws entering said box near the bottom thereof to hold in the plugs of tobacco, a sliding latch-bar mounted alongside said box with inclinations that, when said bar is operated, will engage said trips and remove their jaws from engagement with the plugs of tobacco, means for actuating said latch-bar, and a spring to return said latch-bar to its normal position, substantially as set forth.

7. A machine for making and affixing tags to plugs of tobacco including an open-bottom tobacco-box for receiving the plugs of tobacco that are to be tagged, a conveyer-belt beneath said box for conveying said plugs, a device for receiving and releasing plugs from said box so they may fall upon said conveyer, and a common mechanism for driving the conveyer and actuating such releasing device.

8. A machine for making and affixing tags to plugs of tobacco including an open-bottom tobacco-box for receiving the plugs that are to be tagged, a device near the bottom for holding said plugs in the box, a sliding latch-bar for releasing such holding device, when the plugs are desired to be fed to the machine, a conveyer for conveying the plugs from the box, suitable pulleys on which the conveyer is mounted, and a common means for actuating said conveyer-pulleys and said sliding latch-bar.

9. A machine for making and affixing tags to plugs of tobacco including an open-bottom box to receive the tobacco that is to be tagged, a device for holding the plugs in the box when desired, a conveyer-belt immediately beneath the box, a sliding plate beneath the box with inclined projections adapted to engage and elevate the box, a sliding latch for releasing said holding device, and a common means for actuating the belt, sliding plate and releasing-latch, substantially as set forth.

10. A machine for making and affixing tags to plugs of tobacco including a belt for conveying the tobacco to the tagging mechanism, pulleys on which said belt is mounted, one of which is provided with pins 112, the spring-actuated catch 115 for holding said pulley, the shaft 100 provided with the cam-plate 106, the built-up plate 107 having secured to it the hooked pawl 110, the spring 111, and the links 109 connected to the framework, combined substantially as set forth.

11. A machine for making and affixing tags to plugs of tobacco including a suitable frame, a tobacco-box mounted thereon and having an open bottom, a trip mounted on the box for holding the plugs in the box, a latch slidably mounted on the box for releasing the trip, a sliding plate with inclined edges for elevating the box, an inverted-T-shaped lever 89, means on the latch and sliding plate for such lever to engage and operate them, rollers on the opposite arm of such lever, the cam-plate 94 for actuating such lever, the pulley 97, the chain 99, and the shaft 100 for actuating said cam, all combined substantially as set forth.

12. A machine for making and affixing tags to plugs of tobacco including suitable rolls for feeding the metal strip from which the tags are to be made through the machine, a reciprocable bar, pawl-and-ratchet mechanism connecting the said bar and feed-rolls for driving the same, a driving-shaft, a cam mounted thereon for reciprocating said reciprocable bar, the build-up plate 47 secured to the end of said reciprocable bar and having the slot 48, the friction-wheel 56 mounted on the plate 47 to engage the cam 49, and the spring 54, to return the reciprocable bar after an operation thereof, all combined substantially as set forth.

In witness whereof I have hereunto set my hand this 12th day of January, 1898.

JOHN R. COOK.

Witnesses:
R. D. HAWKINS,
V. H. LOCKWOOD.